INVENTOR
T. M. BURFORD
BY
Lyman Sherman
ATTORNEY

STABILIZED PULSE REGENERATOR

United States Patent Office 3,404,232
Patented Oct. 1, 1968

3,404,232
STABILIZED PULSE REGENERATOR
Thomas M. Burford, Madison, N.J., assignor to Bell Telephone Laboratories, Incorporated, New York, N.Y., a corporation of New York
Filed Dec. 1, 1964, Ser. No. 415,054
10 Claims. (Cl. 178—70)

ABSTRACT OF THE DISCLOSURE

This application relates to arrangements for stabilizing pulse amplitude detectors of the type used in pulse regenerators. This is accomplished by sampling each pulse at a so-called "primary" decision point and at at least two other so-called "secondary" decision points which bracket the primary decision point, where each decision point is characterized by a specified reference level and timing. Whenever a pulse falls between a pair of secondary decision points, correcting signals are generated which readjust the relative level and/or timing of the decision points relative to said pulses.

This invention relates to the stabilization of pulse communications systems.

It is well known that a salient characteristic of pulse code modulation (PCM) transmission is the ability to reconstruct the transmitted pulse train after it has traveled through a dispersive, noisy medium. This process is referred to as pulse regeneration and includes retiming of the pulses and regeneration of their amplitudes. To achieve these results, a pulse regenerator is called upon to make two decisions. It must decide when to sample the signal and it must decide whether the signal amplitude is above or below some specified threshold during the sampling interval. This presupposes certain reference data against which the signal is to be measured. If for any reason there is a change in the system, the reference against which the signal is measured should change in a corresponding manner if the regenerated pulse train is to be a true replica of the original pulse train signal. Various methods of achieving stabilization of the regeneration network of a PCM system have been described in the literature. See, for example, the article by M. R. Aaron entitled, "PCM Transmission in the Exchange Plant," published in the January 1962 issue of the Bell System Technical Journal, pages 99–142.

The present invention is based upon the use of signals generated by secondary or auxiliary amplitude sensing circuits to correct the amplitude sensing level and sampling time of a primary sensing circuit.

In accordance with the present invention, a plurality of secondary amplitude sensing circuits are employed together with a primary amplitude sensing circuit (such as a regenerator in a bilevel PCM system) to maintain the primary amplitude sensing circuit within a preferred operating range. In a PCM system the preferred operating range is one for which the error rate is minimum.

In the specific embodiment of the invention to be described in greater detail hereinbelow, amplitude stabilization is achieved by simultaneously sampling the signal amplitude at the primary sensing threshold level and at at least one additional threshold level above the primary sensing level and at at least one additional threshold level below the primary sensing level.

If the primary and secondary amplitude sensing circuits arrive at the same decision with respect to the amplitude of the signal pulse, no amplitude correcting signals are generated. If, on the other hand, one or the other of the secondary sensing circuits arrives at a decision that is different than that of the primary sensing circuit, this is taken to indicate that the threshold at which the primary sensing circuit is adapted to operate is improper in the sense that operation at this threshold may tend to increase the error rate of the system. Under these conditions, an amplitude correcting signal is generated which is used either to adjust the gain of a signal amplifier located ahead of the primary circuit or, alternatively, to adjust the threshold level of all the sensing circuits. The effect, in either instance, is to change the relative amplitudes of the signal pulses and the thresholds at which the sensing circuits operate.

Timing adjustments are made by the additional sampling of the signal at times other than the primary sensing time. In the specific illustrative embodiment to be described, the signal is sampled at a time earlier than the primary sampling time and again at a time later than the primary sensing time, but at the same threshold level as the primary sensing circuit. The decisions reached by the primary and secondary sensing circuits are then compared. If all three are the same, no timing correction signals are generated. If, on the other hand, one or the other secondary sensing circuits arrives at a decision that is different than that of the primary sensing circuit, this is taken as an indication that the samples may have been taken at the wrong times. In accordance with this embodiment of the invention, a timing correction signal is then generated which adjusts the sampling times so as to tend to reduce the error rate.

The specific sampling times and threshold levels of the amplitude sensing circuits, and the number of such circuits given above, are merely intended to be illustrative of the many possible arrangements that can be used to practice the invention. What arrangement is used in any particular situation would depend upon many factors, such as cost and the characteristics of the system.

The advantages of the present invention and its various features will appear more fully upon consideration of the illustrative embodiment now to be described in detail in connection with the accompanying drawings, in which:

FIG. 1, included for purposes of explanation, is a superposition of various possible pulse sequences showing the formation of an eye diagram;

Figure 1:
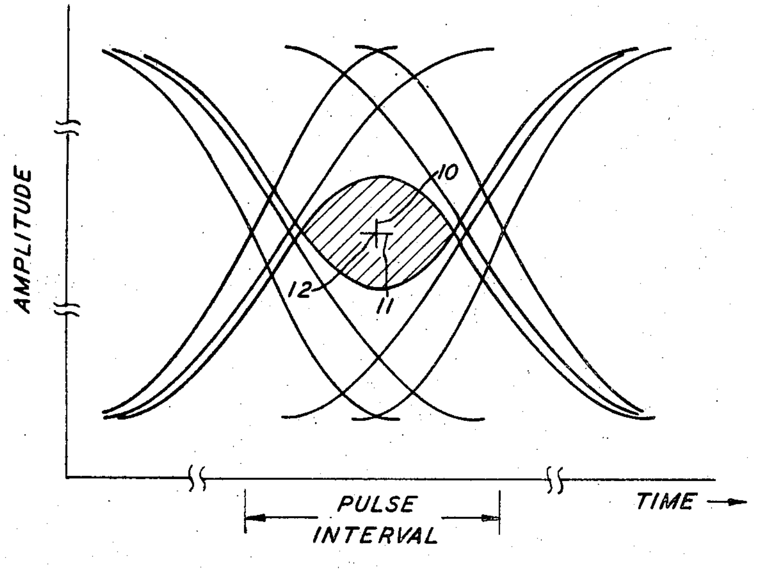

The operation of the present invention can be explained by reference to the so-called "eye" diagram, of the type described in an article by J. S. Mayo entitled "Pulse-code Modulation" published in the November 1962 issue of Electro-Technology, pages 88–98. (Also see United States Patents 3,057,957, 3,041,540, and "A Bipolar Repeater for Pulse Code Modulation Signals," by J. S. Mayo, the Bell System Technical Journal, January 1962, pages 25–98.) The eye diagram, as illustrated in FIG. 1, is a convenient graphical representation of the distribution of pulse shapes within a pulse interval, taking into account the degradation of the pulses reaching the decision point in, for example, a regenerator of a bilevel PCM repeater. The diagram consists of a superposition of pulses within a pulse interval, for all possible pulse sequences. Typically, such a diagram has a region within which no noise free signal occurs. This region is termed the eye, and is shown as the shaded region in FIG. 1.

In multilevel systems, a separate eye exists for each of the levels.

The outline of each eye, formed by the worst combination of pulse sequences, determines when the signal should be sampled and what the threshold level of the detector should be to achieve a satisfactory error rate. These timing and amplitude references are built into the device with regard to the eye diagram, so as to minimize the error rate in the presence of amplitude noise and timing noise. These references can be represented by two intersecting crosshairs within the eye, as shown in FIG. 1. The vertical crosshair 10 indicates the time at which the pulse is sampled. The horizontal crosshair 11 indicates the threshold level against which the pulse is measured. It is common practice to refer to the point of intersection 12 of the crosshairs as the decision point.

Figure 2:
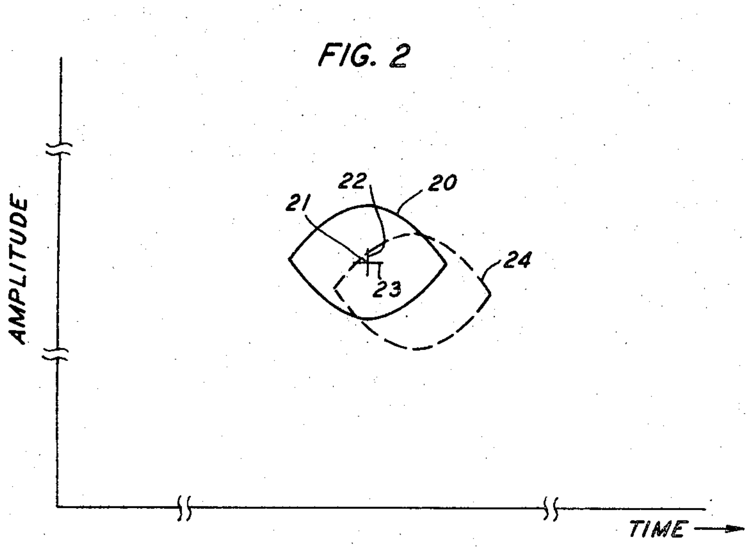
FIG. 2 shows the effect of a relative displacement of a typical eye with respect to a decision point located within an eye diagram.

FIG. 2 shows a typically-shaped eye 20 and a decision point 21, defined by the intersecting crosshairs 22 and 23, optimally located within the eye. If for any reason the eye moves with respect to the decision point, as indicated by the dashed eye 24 in FIG. 2, the decision point is no longer optimally located and the error rate tends to increase. To maintain a favorable error rate, it is necessary to provide some means for sensing this relative displacement of the decision point relative to the eye, and for making suitable corrections.

Figure 3:
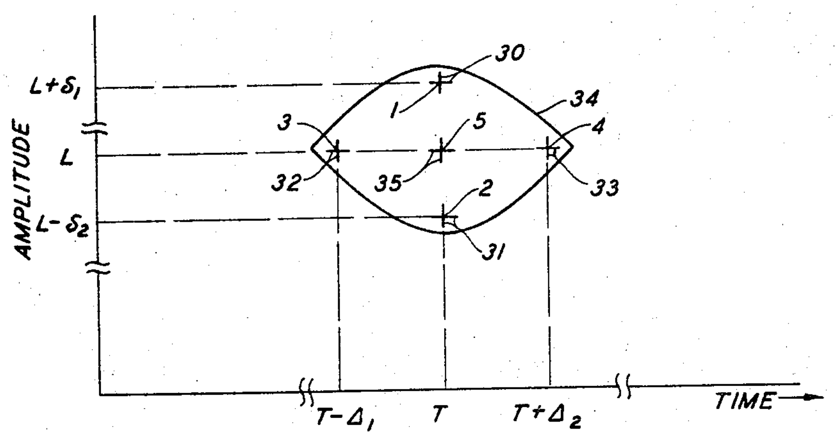
FIG. 3 shows a particular distribution of primary and secondary decision points within an eye diagram in accordance with the invention.

In accordance with the invention, the location of the decision point is stabilized relative to the eye diagram, by the inclusion of secondary decision points within the eye bracketing the primary decision point. These are provided by additional amplitude sensing devices. In FIG. 3, the secondary decision points 1, 2, 3 and 4 are defined by the pairs of intersecting crosshairs 30, 31 and 32, 33 within the eye 34. The centrally located crosshairs 35 define the primary decision point 5 of the primary sensing circuit.

In the particular arrangement shown in FIG. 3, decision points 1, 2 and 5, are made at the same time, T, but at different levels. The primary decision, however, is made at level L, whereas the secondary decision 1 is made at a higher level, $L+\delta_1$, while the secondary decision 2 is made at a lower level $L-\delta_2$.

Decisions 3, 4 and 5, on the other hand, are made at the same level L, but at different times. The primary decision 5 is made at time T, whereas the secondary decision 4 is made later at time, $T+\Delta_2$, while the secondary decision 3 is made at time $T-\Delta_1$.

Figure 4:
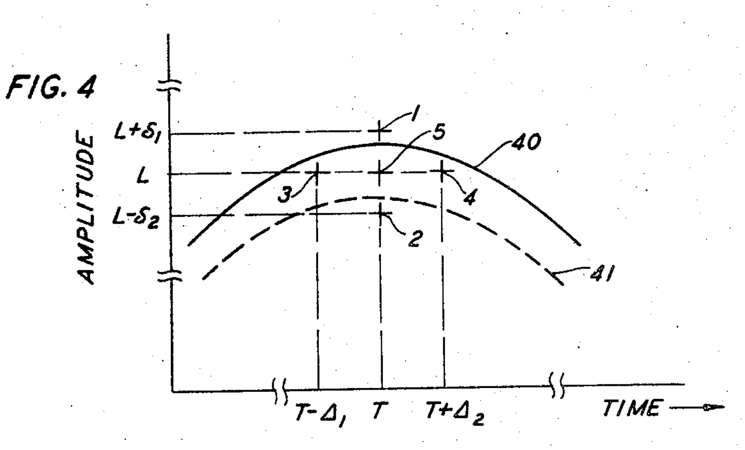
FIGS. 4 and 5 show various possible pulse positions with respect to the decision points.

With the system operating normally, a signal pulse, including noise, will have an amplitude which usually either exceeds all decision levels or is less than all decision levels in the particular eye under consideration. In either of these cases, all detectors arrive at the same decision and no corrective signals are generated. If, however, conditions in the system change such that the relative amplitude of the signal pulse with respect to the decision level L is altered, the sample measured is more likely to fall between the decision points. This condition is illustrated in FIG. 4 which shows the decision points 1 through 5 and two possible signal conditions. In the first condition illustrated, a signal 40 is shown passing between points 1 and 5. For this case, point 1 will arrive at a decision that is different than that of points 2 and 5. Upon comparing decisions 1 and 5 and decisions 2 and 5, the equipment decides that the decision points are no longer properly positioned with respect to the eye, and corrective signals are generated which relocate the decision points relative to the eye. In this first illustrative case, because points 2 and 5 arrived at the same decision, it is assumed by the device that the eye has drifted downward with respect to the decision points. Therefore, the corrective signal can be employed either to increase the gain of the amplifier preceding the sensing device so as to increase the amplitude of signal 40 or, alternatively, to reduce the magnitude of level L.

If the signal passes below point 5 but above point 2, as illustrated by signal 41 in FIG. 4, decisions 1 and 5 are the same, but different than decision 2. In this latter case, it is assumed that the eye has drifted upward with respect to the decision points. In this second illustrative case, therefore, the corrective signal can be used either to reduce the gain of the signal amplifier or to increase the level L.

Figure 5:
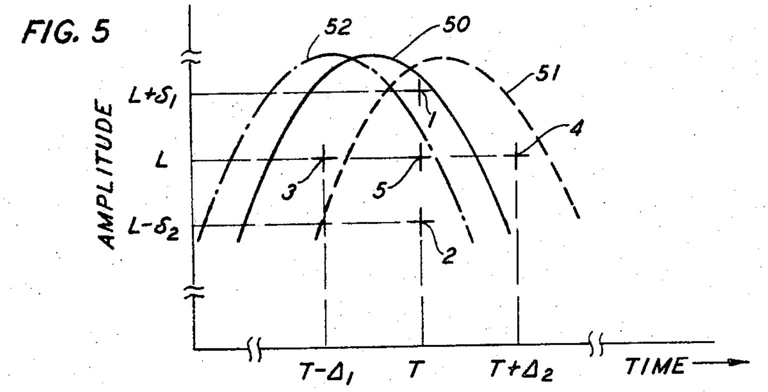

In both cases, it was assumed that the timing of the sensing device was in synchronism with the pulses and hence, only amplitude variations were considered. It is apparent, however, that the timing circuit, which governs when the pulses are to be sampled, can fall out of synchronism with the signal pulses. This condition is illustrated in FIG. 5 which shows the decision points 1 through 5, and three possible signals 50, 51 and 52. Signal 50 is shown as being sampled late. As a result, the amplitude of the signal at time $T+\Delta_2$ is below level L, and point 4 reaches a decision which is different than those reached at points 3 and 5. As a result of this, a corrective signal is generated which advances the sampling times.

If, on the other hand, the signal is sampled too early, as indicated by signal 51, point 3 reaches a decision that is different than those reached by points 4 and 5. The result is to generate a corrective signal which retards the sampling times.

There are additional possible situations which should be noted. For example, pulse 52 shown in FIG. 5 has the proper amplitude, but because it is so far out of time synchronization, decision point 1 reaches an incorrect decision. This would result in the generation of an amplitude correction signal which, however, is not required. If such a situation is anticipated in the system, and if it is desired to avoid the generation of spurious amplitude correction signals, additional circuitry would be required. This might include additional decision points within the eye and, in any event, would require that amplitude and timing corrections be based upon the outputs from a greater number of decision points instead of only the outputs from groups of three decision points, as described herein.

While the effects of changes in amplitude and timing were considered separately, for purposes of explanation, it is to be understood that, in general, changes can occur simultaneously in both amplitude and timing and corrections in both would be made simultaneously. On the other hand, it is equally apparent that in any particular system, timing or amplitude corrections can be made by means other than those described above, in which case only one type of correction need be made in accordance with the present invention.

Figure 6:
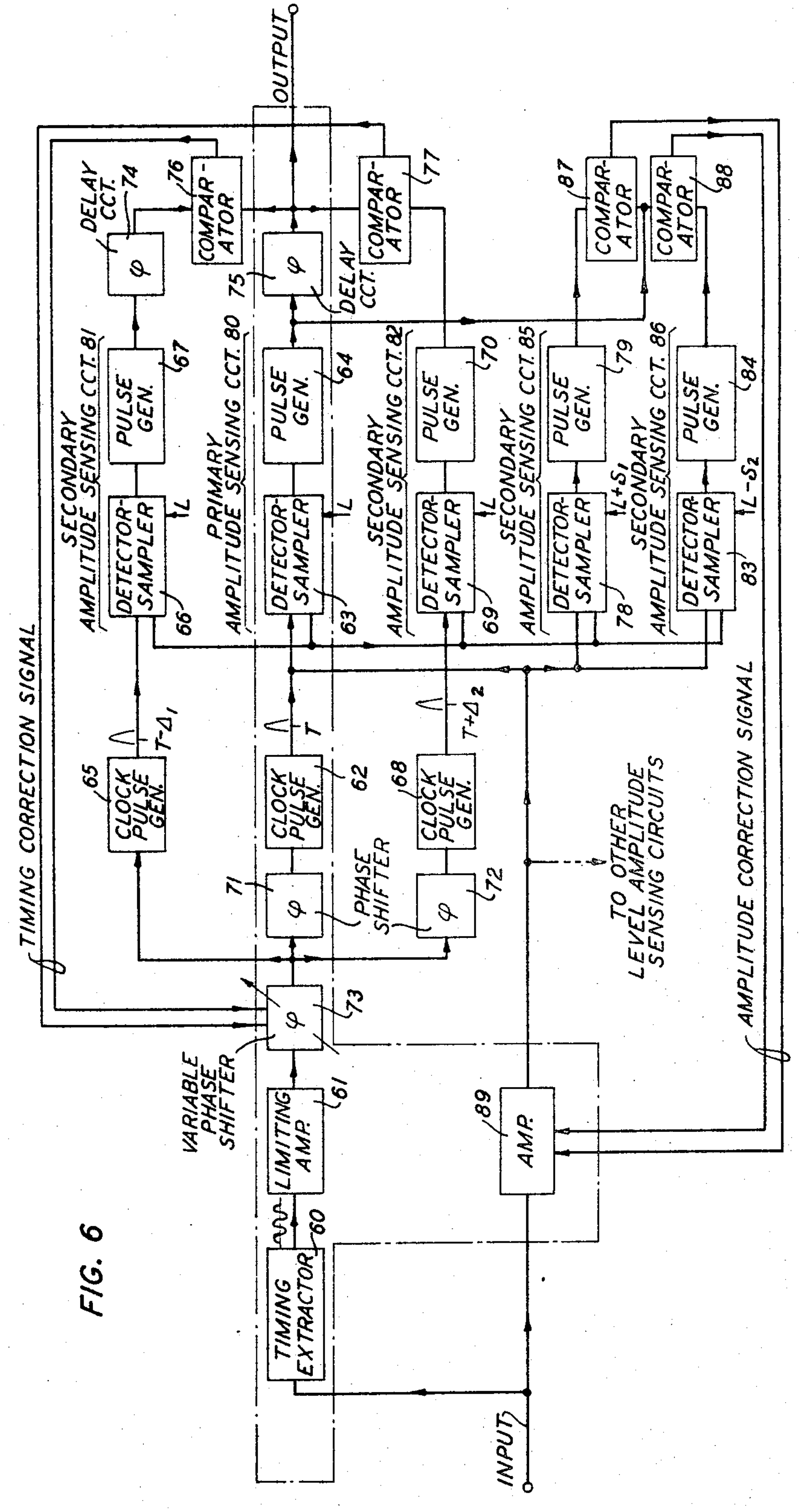
FIG. 6 is a block diagram of a stabilized pulse communications system in accordance with the invention.

FIG. 6 shows, in block diagram, a stabilized pulse communications system, in accordance with an illustrative embodiment of the present invention. The basic timing and primary amplitude sensing portion of the circuit, (included within the dot and dashed outline) comprises a timing extractor 60, whose output is a sine wave having a frequency equal to the symbol (pulse) repetition frequency, a limiting amplifier 61, a clock-pulse generator 62, a detector-sampler 63, and a pulse generator 64. The detector-sampler 63 and pulse generator 64 taken together constitute the primary amplitude sensing circuit 80. In a typical bilevel PCM system repeater, sensing circuit 80 would constitute the "regenerator."

In operation, timing information is extracted from the pulse train and used to synchronize the clock-pulse generator. The detector-sampler examines the pulse train at a time determined by the clock-pulse generator. If the amplitude of the pulse train exceeds a preset threshold level during this examining interval, the detector-sampler generates an output pulse which triggers the pulse generator. The latter, in turn, generates an output pulse of prescribed amplitude and duration.

If, on the other hand, the amplitude of the pulse train during the examining interval is less than the prescribed threshold level, the pulse generator is not activated and no output pulse is produced during that particular time interval.

Associated with the basic timing and pulse regenerator circuit illustrated in FIG. 6 are four additional circuits, two of which provide timing correction information and two of which provide amplitude correction information. Specifically, timing correction information is provided by the circuit comprising clock-pulse generator 65, detector-sampler 66 and pulse generator 67, and by the circuit comprising clock-pulse generator 68, detector-sampler 69 and pulse generator 70.

The detector-sampler and pulse generator combinations 66–67 and 69–70 are basically the same as the primary sensing circuit comprising detector-sampler 63 and pulse generator 64. However, since the outputs from the former detector-sampler, pulse generator combinations are only used for comparison purposes, these units shall be referred to hereinafter as the "secondary amplitude sensing circuits," "secondary sensing circuits," or simply "secondary circuits" to distinguish them from the primary amplitude sensing circuit 80 which, in addition, provides the output signal. Thus, in FIG. 6, these additional circuits are designated secondary amplitude sensing circuits 81 and 82.

While only one primary amplitude sensing circuit is shown, it is understood that in a multilevel system, additional primary amplitude sensing circuits would be employed. Signal pulses to these other primary sensing circuits would be provided from the output of amplifier 89, as indicated by the dotted arrow.

Since each level is characterized by a separate "eye," additional secondary sensing circuits could also be included, in accordance with the invention, at more than one level of a multilevel PCM system, although they are not necessary in the embodiment of FIG. 3.

Referring back to FIG. 3, primary sensing circuit 80 corresponds to decision point 5, secondary sensing circuit 81 corresponds to decision point 3, and secondary sensing circuit 82 corresponds to decision point 4. Since these three decision points are at the same level L, detector-samplers 63, 66 and 69 are shown as operating at the same threshold level L. Relative timing of the clock pulses is produced by the phase shifters 71 and 72. Timing control of all three clock pulses relative to the signal pulses is provided by the variable phase shifter 73.

The output pulses from circuit 80 and secondary sensing circuits 81 and 82 are brought back into time phase by means of relay circuits 74 and 75 and coupled into comparators 76 and 77. Comparator 76 compares the outputs from primary sensing circuit 80 and secondary sensing circuit 81, while comparator 77 compares the outputs from primary sensing circuit 80 and secondary sensing circuit 82.

When all three circuits reach the same decision as to the presence or absence of a pulse, the output signals from the two comparators are the same. Under this condition there is no net signal applied to the variable phase shifter 73 and, hence, no timing correction is made. If, on the other hand, the output from either secondary sensing circuit 81 or 82 is different than the output from sensing circuit 80, the comparator outputs are also different, thereby producing a net signal at the variable phase shifter 73. The latter is then activated and a timing correction made.

Figure 7:
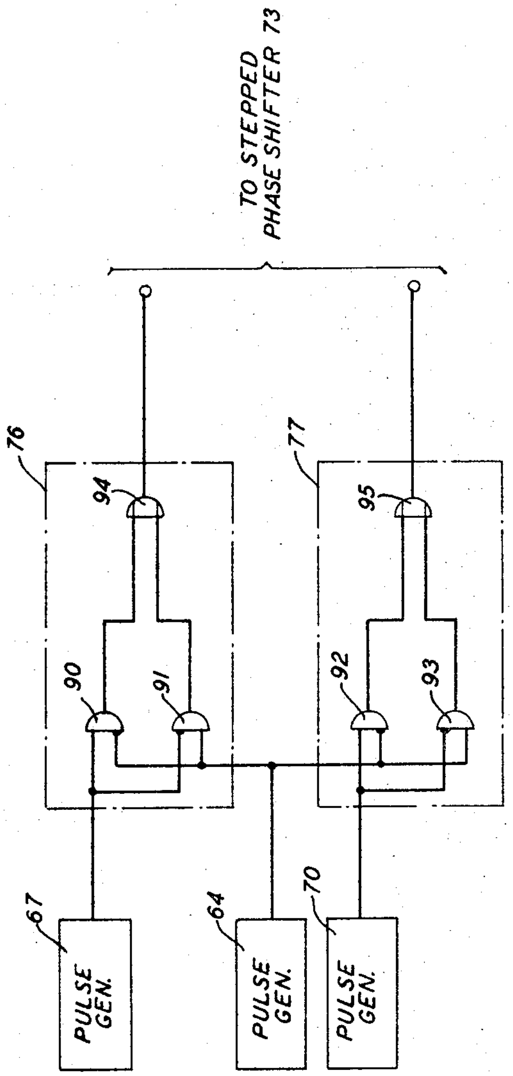
FIG. 7 illustrates the use of "Exclusively-OR" circuits as comparators.

The operation of the comparators is explained in greater detail in connection with FIG. 7, in which the comparators 76 and 77 are illustrated as "Exclusively-OR" circuits of the type described on page 411 of a book by J. Millman and H. Taub entitled "Pulse and Digital Circuits," McGraw-Hill Book Company, Incorporated, 1956. Comparator 76 comprises a pair of "inhibitors" 90 and 91 and an "OR" gate 94. Comparator 77 comprises "inhibitors" 92 and 93 and "OR" gate 95.

If the signals from sensing circuit 80 and sensing circuits 81 and 82 are the same (all arrive at the same decision), there is no output signal produced by either of the comparators. If the output from sensing circuit 81 is different than the outputs from sensing circuit 80 and sensing circuit 82, however, there is an output from comparator 76 but none from comparator 77. Similarly, if the output from sensing circuit 82 is different than the outputs from sensing circuit 80 and sensing circuit 81, there is an output produced by comparator 77 but not by comparator 76.

It is understood that the use of "Exclusively-OR" circuits as comparators is merely intended to be illustrative. Other logic circuits can be used, as would be apparent to those skilled in the art.

Referring again to FIG. 6, the remaining two additional circuits, comprising detector-sampler 78 and pulse generator 79, and detector-sampler 83 and pulse generator 84, provide amplitude correction information. The combinations of detector-sampler and pulse generator, to be referred to hereinafter as secondary amplitude sensing circuits 85 and 86, respectively, correspond to the decision points 1 and 2 in FIG. 3. Since they examine the signal pulses at the same time as the primary amplitude sensing circuit 80, they are shown deriving clock pulses from clock-pulse generator 62. However, because they examine the signal at different threshold levels, the reference level applied to each is different. In particular, the threshold level at detector-sampler 78 is shown at $L+\delta_1$, and that at detector-sampler 83 is shown at $L-\delta_2$, where $\delta_1$ and $\delta_2$ are not necessarily equal to each other.

The outputs from sensing circuit 80 and sensing circuit 85 are compared in comparator 87 while the outputs from sensing circuit 80 and sensing circuit 86 are compared in comparator 88. The comparators 87 and 88 can be "Exclusively-OR" circuits of the type explained in connection with FIG. 7, or any other suitable logic circuit.

The amplitude correction signal produced by comparators 87 and 88 is shown applied to a pulse amplifier 89. As indicated hereinabove, an alternative arrangement wherein this signal varies the threshold level L and the threshold levels in other "eyes" of a multilevel system, can also be employed as a means of amplitude stabilization.

In the embodiment described above, only two secondary sensing circuits are used in each correction network. In addition, corrections in timing and amplitude are made in preselected, constant discrete steps of time units and amplitude units whenever correction is indicated, regardless of the actual magnitude of the deviation of the signal pulse in either time or amplitude. A finer control, which would more accurately correct for deviations in time and amplitude, can be obtained by increasing the number of decision points. However, this also increases the cost and complexity of the system. In practice, therefore, the number of decision points and their distribution within the eye diagram, represent a compromise which takes into account the shape of the eye, cost, system reaction time, system stability and other factors.

Figure 8:
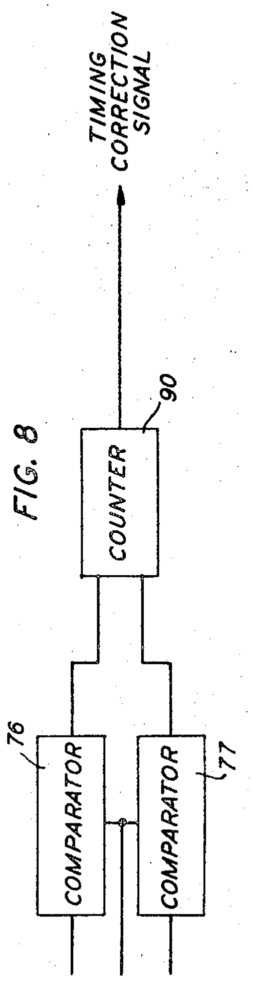
FIG. 8 illustrates the use of a counter to produce correction signals.

In the embodiment of FIG. 6, corrections in timing and amplitude are made on a pulse-by-pulse basis. Alternatively, a counter can be included in the correction circuits and corrections made only if, and after, a specified number of correction signals are produced within a given time interval. In addition, the magnitude of the correction can be made a function of the number of observed errors per unit of time. Such an arrangement is shown in FIG. 8 in which the outputs from comparators 76 and 77 are applied to a counter 90 which, in turn, produces the timing correction signal. A similar arrangement can also be employed to produce the amplitude correction signal. It will be noted that in the embodiment of FIG. 8, the comparators and the correction signal generating means are separate devices. In FIG. 7, on the other hand, both of these functions are performed by the "Exclusively-OR" circuit.

In the illustrative embodiment of FIG. 6, the primary amplitude sensing circuit was characterized as a "regenerator," such as is used at a repeater station in a bilevel PCM system. It should be understood, however, that the invention is not limited to such use but is equally applicable to other uses such as, for example, in terminal apparatus in which the received pulses are not regenerated. The invention is also applicable to multilevel PCM systems.

The principles described above are also applicable as a means for stabilizing the D.C. reference level within a pulse communications system. For example, in a bipolar system secondary decision points would be added above and below the D.C. reference level and appropriate logic circuits included to sense and to correct for drift in the reference level as well as to sense and to correct amplitude and timing errors. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, for use in a pulse communications system;

a timing circuit;

a primary amplitude sensing circuit for detecting the presence or absence of signal pulses relative to a reference threshold at a sampling time determined by said timing circuit;

means for stabilizing said primary circuit comprising a plurality of secondary amplitude sensing circuits for comparing the amplitudes of said signal pulses at combined reference thresholds and times that are different than the combined reference threshold and sampling time of said primary circuit;

means for comparing the output signals from said secondary sensing circuits and said primary sensing circuit and generating timing and amplitude correction signals;

means for utilizing said amplitude correction signal to adjust the relative amplitudes of said pulses and said reference thresholds;

and means for utilizing said timing correction signal to adjust the sampling time.

2. The combination according to claim 1 wherein the output signal from each secondary sensing circuit is compared with the output signal from said primary sensing circuit in an "Exclusively-OR" circuit.

3. In a pulse transmission system;

a primary amplitude sensing circuit;

timing means for actuating said primary circuit at prescribed intervals;

means for synchronizing said intervals with said pulses comprising a plurality of secondary amplitude sensing circuits for sampling each of said pulses at different time intervals;

means for comparing the output signals produced by said secondary sensing circuits and said primary sensing circuit and for generating a timing correction signal;

and means for utilizing said correction signal to vary said intervals.

4. The combination according to claim 3 wherein said primary circuit and said secondary circuits operate at the same threshold level.

5. In a pulse transmission system;

a primary amplitude sensing circuit adapted to operate at a given threshold level corresponding to signal pulses of prescribed amplitude;

means for stabilizing said primary circuit comprising a plurality of secondary amplitude sensing circuits adapted to sample said pulses at threshold levels different than said given level;

means for comparing the output signals from said secondary circuits and said primary circuit and for generating amplitude correction signals;

and means for utilizing said correction signal to adjust the relative amplitudes of said pulses and said threshold levels.

6. The combination according to claim 5 wherein said primary circuit and said secondary circuits sample said pulses at the same time.

7. In a pulse transmission system;

a source of signal pulses;

means for amplifying said pulses;

means for sensing the amplitude of said pulses adapted to operate at a given threshold level;

a plurality of secondary amplitude sensing circuits adapted to sample said pulses at threshold levels different than said given level;

means for comparing the output signals from said primary circuit and said secondary circuits and for producing amplitude correction signals;

and means for utilizing said correction signals to control the gain of said amplifying means.

8. In a pulse transmission system;

a primary amplitude sensing circuit adapted to operate at a given threshold level;

a plurality of secondary amplitude sensing circuits adapted to sample said pulses at threshold levels different than said given threshold level;

means for comparing the output signals from said primary circuit and said secondary circuits and for producing amplitude correction signals;

and means for utilizing said correction signals to vary said threshold levels.

9. In a pulse communications system characterized by an eye diagram for each allowable pulse level;

a primary amplitude sensing circuit for detecting the presence or absence of pulses above a given threshold level corresponding to one pulse level of said system;

said primary circuit corresponding to a decision point within the eye diagram for said one pulse level;

additional secondary amplitude sensing circuits corresponding to additional decision points within said eye diagram for said one level;

and means for combining the output signals from said sensing circuits for stabilizing the operation of said system.

10. A method of stabilizing a pulse detector comprising the steps of:

sampling said pulses at a primary decision point and at at least a pair of secondary decision points bracketing said primary decision point, where each of said decision points is characterized by a specified reference level and timing;

and adjusting the relative level and/or timing of said decision points with respect to said pulses whenever the pulse sampled falls between said pair of secondary decision points.

References Cited

UNITED STATES PATENTS

| | | | |
|---|---|---|---|
| 3,122,729 | 2/1964 | Bothwell et al. ------ | 328—115 |
| 3,225,213 | 12/1965 | Hinrichs et al. ------ | 328—162 |

THOMAS A. ROBINSON, *Primary Examiner.*